W. H. SMYTH.
UTILIZING HEAT ENERGY.
APPLICATION FILED DEC. 11, 1902.

950,082.

Patented Feb. 22, 1910.
5 SHEETS—SHEET 2.

Witnesses:
A. B. Bowers.
J. H. Miller.

Inventor:
William H. Smyth.

W. H. SMYTH.
UTILIZING HEAT ENERGY.
APPLICATION FILED DEC. 11, 1902.

950,082.

Patented Feb. 22, 1910.
5 SHEETS—SHEET 4.

Witnesses:

Inventor:
William H. Smyth

UNITED STATES PATENT OFFICE.

WILLIAM H. SMYTH, OF BERKELEY, CALIFORNIA.

UTILIZING HEAT ENERGY.

950,082.  Specification of Letters Patent.  Patented Feb. 22, 1910.

Application filed December 11, 1902. Serial No. 134,840.

*To all whom it may concern:*

Be it known that I, WILLIAM H. SMYTH, citizen of the United States, residing at Berkeley, in the county of Alameda and State of California, have invented certain new and useful Improvements in Utilizing Heat Energy; and I do hereby declare the following to be a full, clear, and exact description of the same.

This invention relates to improvements in utilizing heat energy.

The object of the present invention is to provide means for the economical utilization of heat energy particularly in its application to the raising or moving of water. This is accomplished by means of the devices illustrated in the accompanying drawings in which:—

Figure 1:
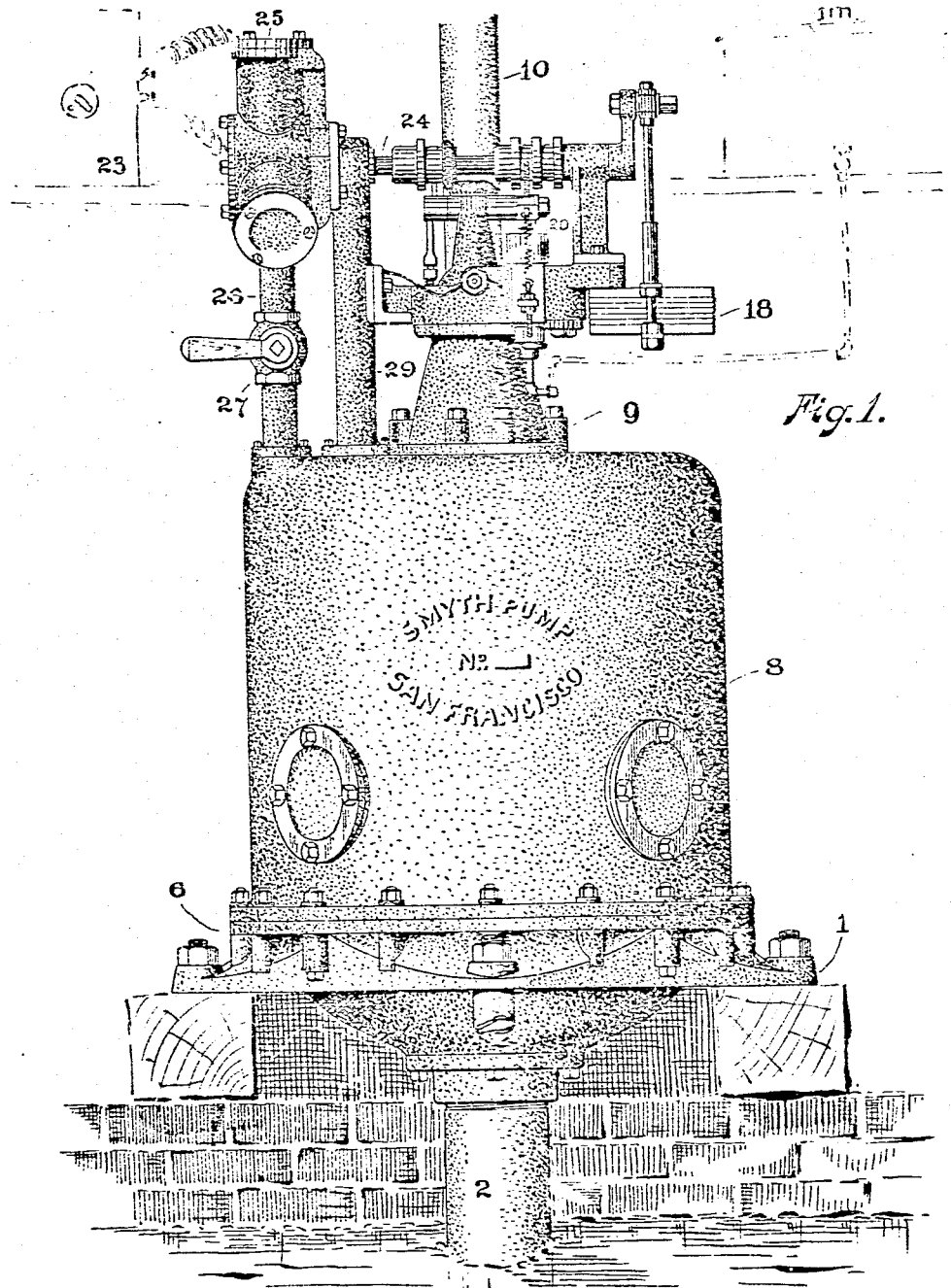
Figures 2, 6:
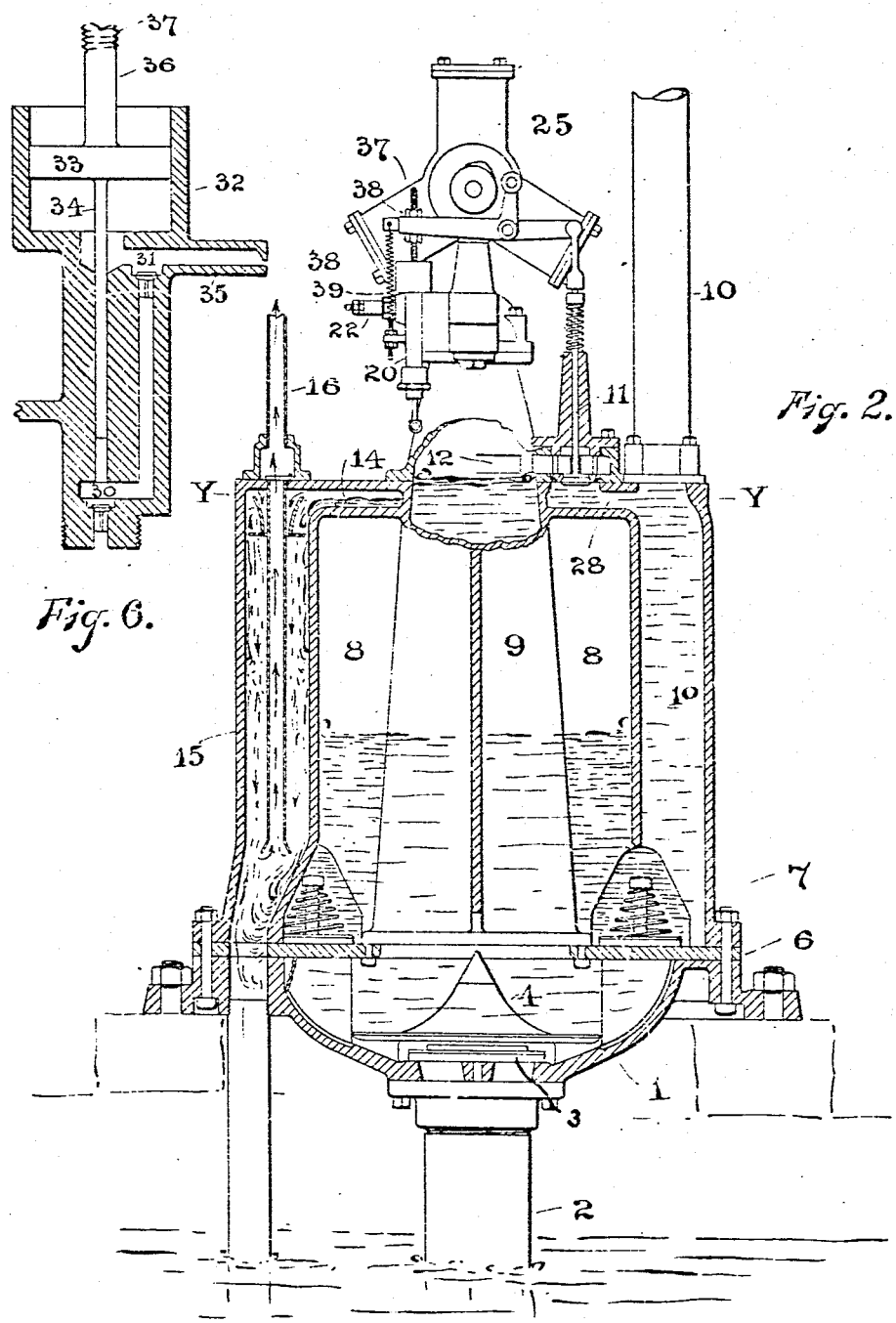
Figure 3:
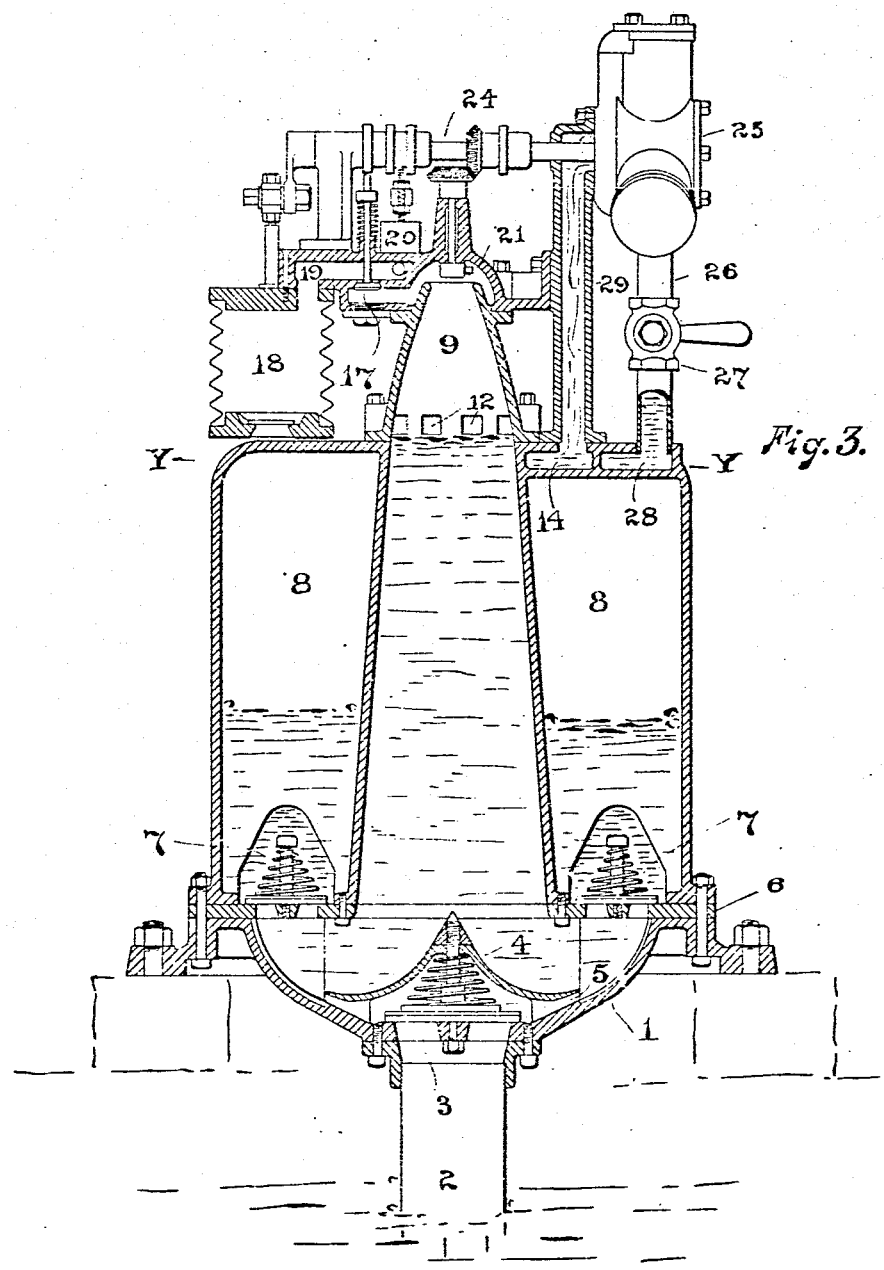
Figure 4:
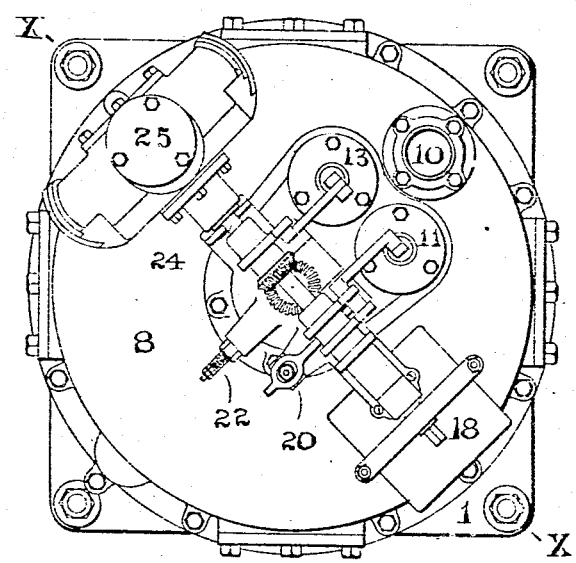
Figure 5:
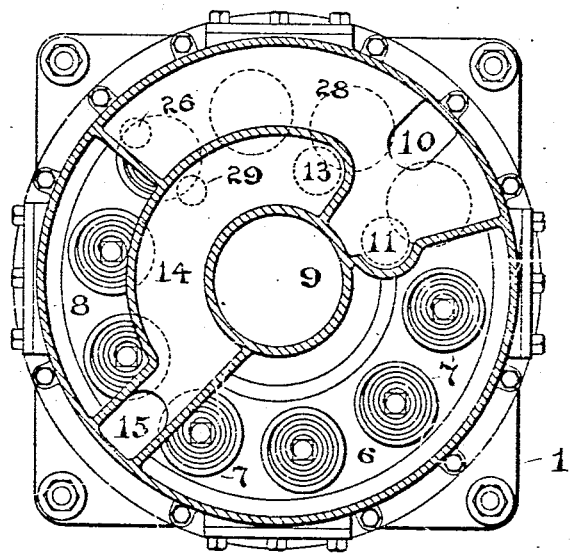
Figure 7:
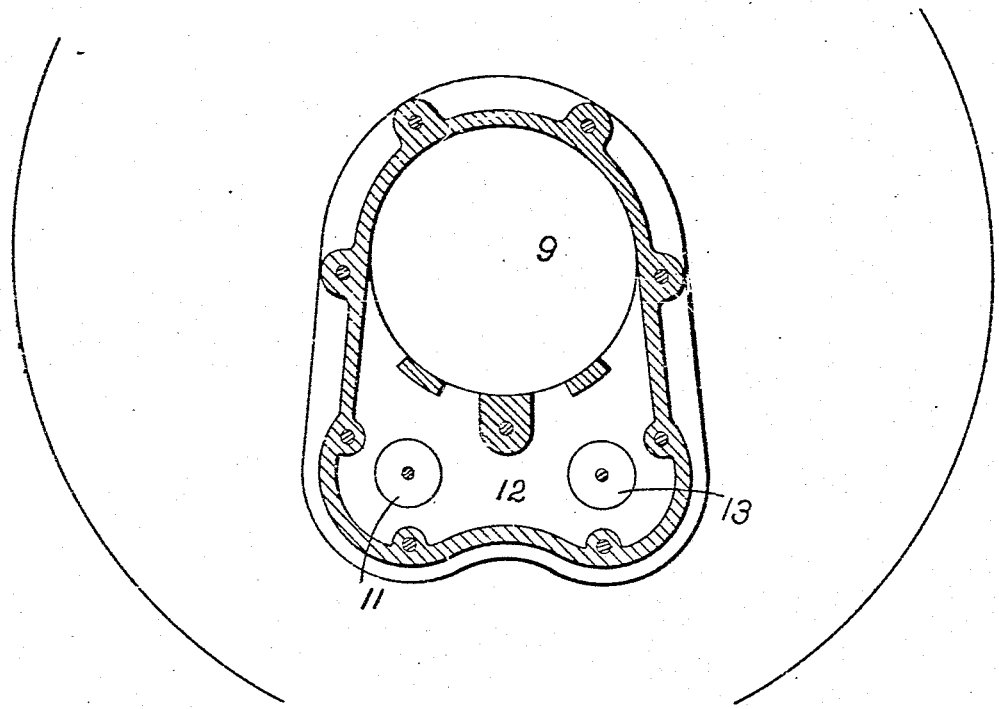
Figure 8:
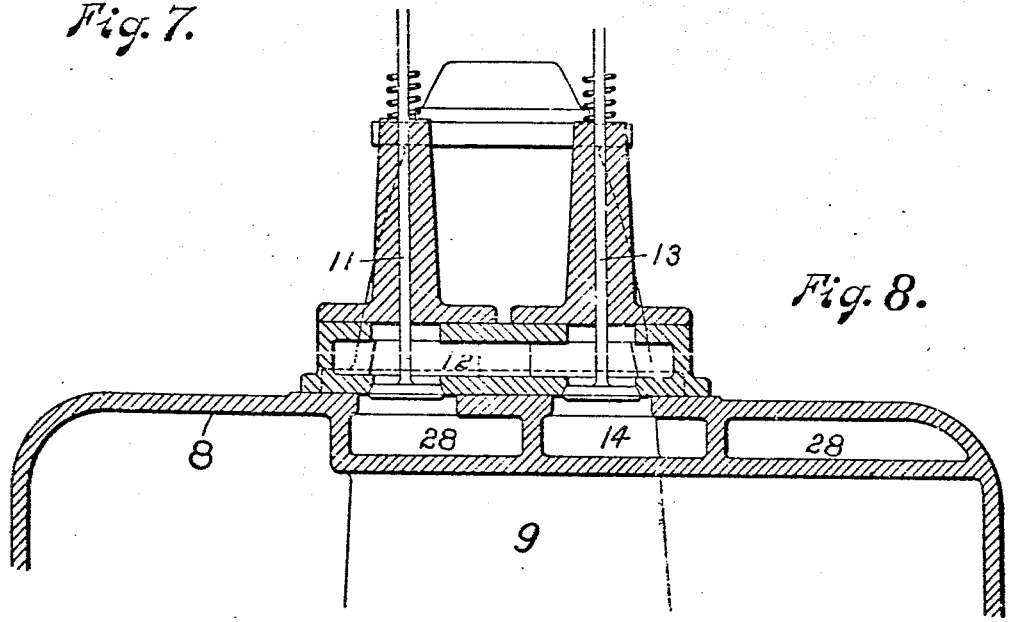

Figure 1 is a front elevation of the device in position. Fig. 2 is a side elevation, portions being broken away to more clearly illustrate it. Fig. 3 is a vertical section of the device on the line X X of Fig. 4. Fig. 4 is a plan view. Fig. 5 is a sectional plan on the plane of Y Y of Figs. 2 and 3. Fig. 6 is a detail on enlarged scale of the fuel introducing device. Fig. 7 is a sectional elevation on enlarged scale through the exhaust and compression valves. Fig. 8 is a horizontal section through the port 12 of the charge and expansion chamber.

Described generally this invention consists of means for introducing an explosive charge in contact with the water to be moved, compressing the charge by the pressure of the head and exploding the charge against the water whereby it is driven or moved to the desired location.

Referring to the drawings, for a more particular description, 1 is concave or saucer shaped end or base, the curved inside forming a water deflecting or directing surface. It is provided with a central downwardly extending suction pipe 2 and having an upwardly opening valve 3 controlling pipe 2. A cone shaped hood 4 is secured over the valve 3, raised slightly above the inner surface of the base to leave an annular opening 5 between it and the surface of the base 1 and forming with this surface an annular recurved deflector.

6 is a plate shown of annular form provided with valves 7 opening upward and arranged in a circle as shown in Fig. 5. 8 is an air chamber resting upon the plate 6 and secured to the base 1 by suitable means thus clamping between it and the base 1 the valve plate 6 forming tight joints therewith. The air chamber 8 is also preferably of substantially annular form. The space surrounded by the air chamber constitutes a charge or expansion chamber 9 of circular section somewhat larger at the bottom than at the top. The bottom of the chamber 9 coincides with the central hole of the valve plate 6. A discharge pipe 10 from the air chamber, which opens thereinto near its bottom, extends upward to the exterior from which point it is continued to any desired place by a suitable pipe. The chamber 9 may extend upwardly above the air chamber, its upper part forming a charge space. The charge space, downward extension and the saucer shaped base form one expansion chamber. Opening into the explosion chamber from the discharge pipe 10 is an inlet governed by a controlled valve 11 called the compression valve. The opening of valve 11 communicates with chamber 9 through a wide port 12. Opening into the same port 12 as valve 11, is a second and similar opening to that just described and along side thereof, also governed by a controlled valve 13. The location of these valves is shown in Figs. 4 and 5 and particularly in Figs. 7 and 8. This last mentioned valve controlled opening serves as an exhaust and communicates from the interior of the chamber 9 through port 12 to the exterior by passage way 14 and 15 and gas exhaust pipe 16. The pipe 16 with its downward extension may and sometimes is entirely dispensed with and the exhaust gases permitted to escape through the downward opening of passage 15. Another opening into the chamber 9 controlled by a valve 17 serves as a charge inlet. An air pump 18 is provided shown in the present instance as a bellows whose outlet 19 communicates with the opening controlled by valve 17. Fuel introducing means are provided which may be of any suitable character and which may introduce any suitable form of fuel. In the present instance I have shown for this purpose, a pump 20 adapted to introduce liquid fuel. An igniting device is also provided which may be of any suitable character and which for the present purposes, I have shown as a rotatable wiper 21, Fig. 3, and an insulated electrode 22, Fig. 4, which are suitably connected to a battery 23 or other source of electrical energy.

Supported in suitable bearings is a shaft 24 rotating continuously in one direction and provided with cams and other suitable mechanical connections with the various valves, fuel and air pumps and sparking wiper to effect their movement and operation in proper sequence. Any suitable means may be provided to cause rotation in shaft 24, either by power or by a handle attached to said shaft. In the drawings I have shown for this purpose, a small hydraulic motor 25 shown as a three cylinder engine having an inlet pipe 26 controlled by a cock or valve 27 connected to the discharge pipe 10 by a passage 28. The motor is also provided with a discharge or exhaust pipe 29 connected to passage 14.

The fuel introducing pump 20 which I preferably employ consists of means to pump the liquid fuel into the machine and simultaneously reduce it to spray or vapor form. As shown in Fig. 6, it consists of a plunger pump of ordinary form so far as concerns the pump. It is provided with inlet and discharge valves 30 and 31 respectively. It differs from ordinary pumps in that it is provided with an air cylinder 32 and piston 33 therein of very much larger size than the fuel plunger 34. The cylinder 32 is provided with a pipe 35 which serves also for the inlet and outlet of air and the outlet of the fuel pump. This pipe 35 enters into the air passage 19. A piston rod 36 serves both for the piston 33 and the plunger 34 and is provided with means for adjusting the length of its stroke consisting in the present instance of threads 37 and adjustable nuts 38 so as to provide for slack or waste motion between the pump piston and the cam which operates it in one direction. A spring 39 effects the motion of this fuel pump in the opposite direction from the operating cam.

The exhaust passages 14 and 15 may be extended as shown in Fig. 2 down to and beneath the surface of the water and the enlarged portion 15 may be supplied with a downward extension of the gas exhaust pipe 16. The portion of pipe 16 which is within the passage 15 may be supplied with a perforated plate at the top as shown and a light valve at any part of its length opening outward, thus constituting this part of the exhaust pipe an effective gas exhausting apparatus in the nature of a water bellows or trompe.

In operation, the pressure in the air chamber or the pressure of the head against which the device is working causes the motor 25 to rotate the shaft 24, the speed thereof being controlled by the valve 27 in the inlet pipe 26. The bellows drives a current of air through the charge space of chamber 9 sweeping out completely the previous charge or the products of its combustion and leaving in the place thereof, a volume of pure air. The position as to height of the exhaust valve 13 determines and maintains a normal level of the upper surface of the water during the introduction of the scavengering air or charge, thus providing for a uniform capacity of the charge space and charge. At the proper time, the fuel pump sprays a suitable amount of fuel vapor into the current of air passing to the valve controlled inlet or into the air in the charge space. When the proper charge is in the explosion chamber, the valve 17 closes; exhaust valve 13 also closes and the compression valve 11 opens. The opening of the valve 11 permits the inflow of water from the air chamber through the discharge pipe 10 into the chamber 9 raising the water therein from its normal level which is that of the valve 13. This admission of water by valve 11 compresses the charge to the pressure of the air chamber or that of the head. Immediately following the compression of the charge, the sparking devices ignite the charge causing it to inflame, expand and drive the water contained in the chamber 9 downward with great violence and rapidity, and, being deflected by the annular return curve of the bottom of the charge chamber, up into the air chamber through the valves 7. From the air chamber it finds exit through the discharge pipe 10. The deflecting hood 4 not only assists in directing the explosion driven water into the air chamber but it also directs the rush of water due to vacuum, in the same direction. The effect of the expansion or explosion of the charge in the chamber 9 displaces a large proportion of the water in this chamber and sometimes the whole of it and in all cases a volume of water several times the original atmospheric volume of the charge. As a consequence of this, a partial vacuum is formed in chamber 10 which permits the atmospheric pressure to drive the water through the inlet pipe 2 past valve 3 with great velocity. The shape of the hood, base and annular passage way 5 directs, as stated, this incoming stream against the valves 7. The kinetic inertia or ram of the inrushing water is thus utilized. The incoming water, having lost much of its energy, rises rapidly to the normal level in chamber 9. Any excess which may come in and raise the water in chamber 9 above its normal level flows away immediately through passage 14 and exit 15 ahead of the spent gases forced out by the incoming air from the bellows, upon the opening of the exhaust valve 13.

I preferably construct the pump or bellows to deliver a larger volume of air than the intended charge and arrange that the fuel is introduced into it after the first portion of the air has passed through. By this means, the spent gases of the last explosion are swept completely out of the charge space and each time a clean uncontaminated charge is furnished.

The arrangement of the exhaust passage 15 described, being the outlet for both the spent gas and exhaust water of the motor, constitutes a simple exhausting device for the spent charges acting upon the principle of a trompe or hydraulic bellows and supplements the pump or bellows. As it is only necessary or desirable to sweep all the spent gases out of the explosion chamber at atmospheric pressure, it would be found convenient in some instances to extend the hydraulic bellows principle and dispense with the mechanical bellows or pump entirely.

Owing to the peculiar nature of the means of utilizing heat energy involved in this invention, it is extremely desirable, if not essential, that no unavoidable obstruction should be interposed in the path of the water piston. Explosive energy is so intense and so transient that the water piston attains an extremely high velocity. In order to provide for this, valve capacity must be provided greatly in excess of that usual under ordinary circumstances involving the moving of water. It therefore becomes a matter of importance that machines operating under the present invention shall be so designed as to permit and provide for great valve area in the path of the water piston, for its exit. A single valve of any ordinary type of sufficiently large capacity would be disadvantageous owing to its liability to get out of order and the mechanical difficulties of construction in the device itself to provide for its convenient location. Another source of trouble arising out of the employment of one valve is the practical impossibility of balancing the inertia of this rapid piston traveling in one direction transversely to the machine. In the present invention, the practical difficulty relating to the valve has been overcome in a simple and satisfactory way by providing a multiplicity of small valves arranged in a circle at the base of the air chamber as already described. This arrangement not only overcomes the stated difficulties relating to the valve but also distributes the shock evenly and prevents the inertia of the water being directed transversely to the machine in one direction.

It is obvious that many changes in construction, arrangement and proportion of the various parts may be made without departing from the essential character of this invention, I therefore do not desire to confine myself in these or any other unessential particulars.

What I claim is:—

1. A device for utilizing heat energy comprising, a combustion and expansion chamber, means to introduce fuel thereinto, an igniter, a chamber to contain a resilient cushion substantially concentric to the expansion chamber against which the fuel expansion directs its energy, a deflector between the chambers to direct water against the cushion, means to introduce water between the fuel and the resilient cushion, and means to prevent the direct return of the greater portion of the water after ignition of the fuel.

2. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers in the path of the water piston and a valve controlled water passage from the exterior into the expansion chamber.

3. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers arranged around the expansion chamber and a valve controlled water passage from the exterior into the expansion chamber.

4. A device for utilizing heat energy comprising an expansion chamber enlarging downward having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber.

5. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, the expansion chamber having an annular recurved end or base adapted to direct water therefrom to the air chamber.

6. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers and a valve controlled water passage from the exterior into the expansion chamber and means adapted to compress the charge prior to ignition.

7. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers arranged around the expansion chamber, a valve controlled water passage from the exterior into the expansion chamber and means adapted to compress the charge prior to ignition.

8. A device for utilizing heat energy comprising an expansion chamber enlarging downward having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber and means adapted to compress the charge prior to ignition.

9. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber, the expansion chamber having an annular recurved end or base adapted to direct water therefrom to the air chamber and means adapted to compress the charge prior to ignition.

10. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers, a valve controlled water passage from the exterior into the expansion chamber and a controllable water valve between the air and expansion chambers whereby the charge is compressed prior to ignition.

11. A device for utilizing heat energy comprising an expansion chamber having in and out flow charge regulating valves and an igniter, said chamber adapted to contain and permit the operation therein of a water piston, an air chamber surrounding the expansion chamber, a plurality of valve controlled passages between the expansion and air chambers arranged around the expansion chamber and a valve controlled water passage from the exterior into the expansion chamber and a controllable water valve between the air and expansion chambers whereby the charge is compressed prior to ignition.

12. A device for utilizing heat energy comprising an expansion chamber enlarging downward having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber and a controllable water valve between the air and expansion chambers whereby the charge is compressed prior to ignition.

13. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, the expansion chamber having an annular recurved end or base adapted to direct water therefrom to the air chamber and a controllable water valve between the air and expansion chambers whereby the charge is compressed prior to ignition.

14. A device for utilizing heat energy comprising, a combustion and expansion chamber, means to introduce fuel thereinto, an igniter, a chamber substantially concentric to the expansion chamber to contain air against which the expansion of the fuel expends its energy, a deflector between the chambers to direct water against the air in the chamber, means to introduce water between the fuel and the air-chamber and a valve to prevent the direct return of the greater portion of the water after ignition of the fuel.

15. A device for utilizing heat energy comprising an expansion chamber having in and out flow charge regulating valves and an igniter, said chamber adapted to contain and permit the operation therein of a fluid piston, means adapted to introduce a gaseous fluid into the expansion chamber, means adapted to maintain a constant normal level of the fluid piston during the introduction of the fluid, an air chamber surrounding the expansion chamber, a valve controlled passage between the expansion and air chambers and a valve controlled water passage from the exterior into the expansion chamber.

16. A device for utilizing heat energy comprising an expansion chamber having in and out flow charge regulating valves and an igniter, said chamber adapted to contain and permit the operation therein of a water piston, means adapted to introduce gaseous fluid into the expansion chamber, means adapted to maintain a constant normal level of the water piston during the introduction of the fluid, an air chamber surrounding the expansion chamber, a valve controlled passage between the expansion and air chambers and a valve controlled water passage from the exterior into the expansion chamber, the expansion chamber having an annular recurved end or base adapted to direct water therefrom to the air chamber.

17. A device for utilizing heat energy comprising an expansion chamber having in and out flow charge regulating valves and an igniter, said chamber adapted to contain and permit the operation therein of a water piston, means adapted to introduce a gaseous fluid into the expansion chamber, means adapted to maintain a constant normal level of the water piston during the introduction of the fluid, an air chamber surrounding the expansion chamber, a valve controlled passage between the expansion and air chambers and a valve controlled water passage from the exterior into the expansion chamber and means adapted to compress the charge prior to ignition.

18. A device for utilizing heat energy comprising an expansion chamber having in and out flow charge regulating valves and an igniter, said chamber adapted to contain and permit the operation therein of a water piston, a bellows for introducing a measured volume of gaseous fluid into the expansion chamber, means adapted to maintain a constant normal level of the water piston during the introduction of the fluid, an air chamber surrounding the expansion chamber, a valve controlled passage between the expansion and air chambers and a valve controlled water passage from the exterior into the expansion chamber.

19. A device for utilizing heat energy comprising an expansion chamber enlarging downward and having in and out flow charge regulating valves and an igniter, said chamber adapted to contain and permit the operation therein of a water piston, a bellows for introducing a measured volume of gaseous fluid into the expansion chamber, means adapted to maintain a constant level of the water piston during the introduction of the fluid, an air chamber surrounding the expansion chamber, a valve controlled passage between the expansion and air chambers, and a valve controlled water passage from the exterior into the expansion chamber.

20. A device for utilizing heat energy comprising an expansion chamber enlarging downward having in and out flow charge regulating valves and an igniter, said chamber adapted to contain and permit the operation therein of a water piston, a bellows adapted to introduce a measured volume of gaseous fluid into the expansion chamber, means adapted to maintain a constant level of the water piston during the introduction of the fluid, an air chamber surrounding the expansion chamber, a valve controlled opening between the expansion and air chambers, a valve controlled water passage from the exterior into the expansion chamber, the expansion chamber having an annular recurved end or base adapted to direct the water therefrom to the air chamber.

21. A device for utilizing heat energy comprising an expansion chamber enlarging downward and having in and out flow charge regulating valves and an igniter, said chamber adapted to contain and permit the operation therein of a water piston, a bellows adapted to introduce a measured volume of gaseous fluid into the expansion chamber, means adapted to maintain a constant level of the water piston during the introduction of the fluid, an air chamber surrounding the expansion chamber, a multiplicity of valve controlled openings between the expansion and air chambers in the path of the water piston and a valve controlled water passage from the exterior into the expansion chamber, the expansion chamber having an annular recurved end or base adapted to direct the water therefrom to the air chamber.

22. A device for utilizing heat energy comprising an expansion chamber having in and out flow charge regulating valves and an igniter, said chamber adapted to contain and permit the operation therein of a water piston, and having a charge space above the water piston of constant area, an air chamber surrounding the expansion chamber, a valve controlled passage between the expansion and air chambers and a valve controlled water passage from the exterior into the expansion chamber and means for forcing through the charge space a volume of air greater than the capacity of said space.

23. A device for utilizing heat energy comprising an expansion chamber having in and out flow charge regulating valves and an igniter, said chamber adapted to contain and permit the operation therein of a water piston, and having a charge space above the water piston of constant area, an air chamber surrounding the expansion chamber, a valve controlled passage between the expansion and air chambers and a valve controlled water passage from the exterior into the expansion chamber, means for forcing through the charge space a volume of air greater than the capacity of said space and means adapted to compress the charge prior to ignition.

24. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber, means for actuating the valves and igniting devices in proper sequence consisting of a continuously rotatable shaft and actuating devices thereon whereby a complete operative cycle is completed at each rotation of the shaft.

25. A device for utilizing heat energy comprising an expansion chamber having in and out flow charge regulating valve and an igniter, said chamber adapted to contain and permit the operation therein of a water piston, an air chamber surrounding the expansion chamber, a valve controlled passage between the expansion and air chambers and a valve controlled water passage from the exterior into the expansion chamber, means for actuating the valves and igniting devices in proper sequence consisting of a motor having a continuously rotatable shaft and actuating devices thereon whereby a complete operative cycle is completed at each rotation of the shaft.

26. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, and means for actuating the valves and igniting devices in proper sequence consisting of a multiple cylinder motor having a shaft and actuating devices thereon whereby a complete operative cycle is completed at each rotation of the shaft.

27. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, a device adapted to atomize liquid fuel and introduce it in the form of spray.

28. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber and a device adapted to atomize and introduce measured volumes of liquid fuel.

29. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber and a device adapted to atomize measured volumes of liquid fuel and introduce it in the form of spray.

30. A device for utilizing heat energy comprising an expansion chamber having in and out flow charge regulating valves and an igniter, said chamber adapted to contain and permit the operation therein of a fluid piston, an air chamber surrounding the expansion chamber, a valve controlled passage between the expansion and air chambers and a valve controlled water passage from the exterior into the expansion chamber, means adapted to compress the charge prior to ignition and means for actuating the valves, igniting devices and compression device in proper sequence consisting of a continuously rotatable shaft and actuating devices thereon whereby a complete operative cycle is completed at each rotation of the shaft.

31. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, means for compressing the charge prior to ignition, and means for actuating the valves, igniting device and compression device in proper sequence consisting of a motor having a continuously rotatable shaft and actuating devices thereon whereby a complete operative cycle is completed at each rotation of the shaft.

32. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber, means for compressing the charge prior to ignition and means for actuating the valves, igniting device and compression device in proper sequence consisting of a multiple cylinder motor having a rotatable shaft and devices thereon whereby a complete operative cycle is completed at each rotation of the shaft.

33. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers, a valve controlled water passage from the exterior into the expansion chamber, a device adapted to atomize liquid fuel and introduce it in the form of spray, and means adapted to compress the charge prior to ignition.

34. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, a device adapted to atomize and introduce measured volumes of liquid fuel and means adapted to compress the charge prior to ignition.

35. A device for utilizing heat energy comprising an expansion chamber having in and out flow charge regulating valves and an igniter, said chamber adapted to contain and permit the operation therein of a water piston, an air chamber surrounding the expansion chamber, a valve controlled passage between the expansion and air chambers and a valve controlled water passage from the exterior into the expansion chamber, a device adapted to atomize measured volumes of liquid fuel and introduce it in the form of spray and means adapted to compress the charge prior to ignition.

36. A device for utilizing heat energy comprising an expansion chamber having in and out flow charge regulating valves and an igniter, said chamber adapted to contain and permit the operation therein of a water piston, means adapted to introduce a measured volume of gaseous fluid into the expansion chamber, means adapted to maintain a constant level of the water during the introduction of the fluid, an air chamber surrounding the expansion chamber, a valve controlled passage between the expansion and air chambers and a valve controlled water passage from the exterior into the expansion chamber and means for actuating the valves, igniting device and charge introducing devices in proper sequence consisting of a continuously rotatable shaft and actuating devices thereon whereby a complete operative cycle is completed at each rotation of the shaft.

37. A device for utilizing heat energy comprising an expansion chamber having in and out flow charge regulating valves and an igniter, said chamber adapted to contain and permit the operation therein of a water piston, means adapted to introduce a measured volume of gaseous fluid into the expansion chamber, means adapted to maintain a constant level of the water piston during the introduction of the fluid, an air chamber surrounding the expansion chamber, a valve controlled passage between the expansion and air chambers, a valve controlled water passage from the exterior into the expansion chamber and means for actuating the valves, igniting device and charge introducing devices in proper sequence consisting of a motor having a continuously rotatable shaft and actuating devices thereon whereby a complete operative cycle is completed at each rotation of the shaft.

38. A device for utilizing heat energy comprising an expansion chamber having in and out flow charge regulating valves and an igniter, said chamber adapted to contain and permit the operation therein of a water piston, means adapted to introduce a measured volume of gaseous fluid into the expansion chamber, means adapted to maintain a constant level of the water piston during the introduction of the fluid, an air chamber surrounding the expansion chamber, a valve controlled passage between the expansion and air chambers and a valve controlled water passage from the exterior into the expansion chamber and means for actuating the valves, igniting devices and charge introducing devices in proper sequence consisting of a multiple cylinder motor having a rotatable shaft and actuating devices thereon whereby a complete operative cycle is completed at each rotation of the shaft.

39. A device for utilizing heat energy comprising a combustion and expansion chamber, means to introduce fuel thereinto, an igniter, a chamber substantially concentric to the expansion chamber to contain air against which the expansion of the fuel expends its energy, a deflector between the chambers to direct water against the air in the chamber, a valve to introduce water between the fuel and the air chamber, and a valve to prevent the direct return of the greater portion of the water after ignition of the fuel.

40. A device for utilizing heat energy comprising a chamber having in and out flow charge regulating valves and an igniter, means adapted to operate said valves consisting of a water driven motor, means adapted to cause a current of air to pass through said chamber consisting of a trompe or bellows.

41. In a device for utilizing heat energy comprising a chamber having in and out flow charge regulating valves and an igniter, means adapted to operate said valve consisting of a water driven motor, means adapted to cause a current of air to pass through said chamber consisting of a trompe or water bellows adapted to utilize the exhaust from the motor.

42. A device for utilizing heat energy comprising a chamber having in and out flow charge regulating valves and an igniter, said chamber adapted to contain and permit the operation therein of a water piston, an air cushion adapted to resist the movement of the water piston and means adapted to remove the spent gases comprising a trompe or water bellows.

43. A device for utilizing heat energy comprising a chamber having in and out flow charge regulating valves and an igniter, said chamber adapted to contain and permit the operation therein of a water piston, an air cushion adapted to resist the movement of the water piston and means adapted to remove the spent gases comprising a trompe or water bellows and means adapted to compress the charge prior to ignition.

44. A device for utilizing heat energy, comprising a combustion and expansion chamber, means to introduce a measured volume of fuel thereinto, an igniter, a chamber to contain a resilient cushion substantially concentric to the expansion chamber against which the expansion of the fuel expends its energy, a deflector between the chambers to direct water against the cushion in the chamber, and means to prevent the direct return of the greater portion of the water after ignition of the fuel.

45. A device for utilizing heat energy comprising, a combustion and expansion chamber, means to introduce a measured volume of fuel thereinto, an igniter, a chamber substantially concentric to the expansion chamber to contain air against which the expansion of the fuel expends its energy, a deflector between the chambers to direct water against the air in the chamber, means to introduce water between the fuel and the air chamber, and a valve to prevent the direct return of the greater portion of the water after ignition of the fuel.

46. A device for utilizing heat energy comprising, a combustion and expansion chamber, means to introduce a measured volume of fuel thereinto, an igniter, a chamber substantially concentric to the expansion chamber to contain air against which the expansion of the fuel expends its energy, a deflector between the chambers to direct water against the air in the chamber a valve to introduce water between the fuel and the air chamber, and a valve to prevent the direct return of the greater portion of the water after ignition of the fuel.

47. An apparatus for raising or moving water comprising a combustion or expansion chamber, means for introducing fuel thereinto, an igniter, an air chamber surrounding said chamber, means for introducing water into the expansion chamber, a passage between the expansion chamber and the air chamber and a deflector having a raised center substantially concentric with the expansion chamber whereby the water expelled from the expansion chamber is deflected laterally into the air chamber.

48. An apparatus for raising or moving water comprising a combustion or expansion chamber, means for introducing fuel thereinto, an igniter, an air chamber surrounding said chamber, means for introducing water into the expansion chamber, a passage between the expansion chamber and the air chamber and a deflector having a raised center substantially concentric with the expansion chamber whereby the water expelled from the expansion chamber is deflected laterally into the air chamber and a substantially annular passage around said deflector for incoming water.

49. An apparatus for raising or moving water comprising a substantially circular combustion or expansion chamber, means for introducing fuel thereinto, an igniter, an air chamber surrounding and communicating with said chamber and substantially concentric therewith, a water inlet valve beneath the expansion chamber substantially concentric therewith.

50. An apparatus for raising or moving water comprising a substantially circular combustion or expansion chamber, means for introducing fuel thereinto, an igniter, an air chamber surrounding and communicating with said chamber and substantially concentric therewith, a water inlet valve beneath the expansion chamber substantially concentric therewith and a deflector above the inlet valve substantially concentric with the expansion chamber whereby water expelled from the expansion chamber is deflected laterally into the air chamber.

51. An apparatus for raising or moving water comprising a substantially circular combustion or expansion chamber, means for introducing fuel thereinto, an igniter, an air chamber surrounding and communicating with said chamber and substantially concentric therewith, a water inlet valve beneath the expansion chamber substantially concentric therewith, a deflector above the inlet valve substantially concentric with the expansion chamber whereby water expelled from the expansion chamber is deflected laterally into the air chamber and a passage or passages around the edges of the deflector for the incoming water.

52. A device for utilizing heat energy comprising a combustion and expansion chamber, means for introducing fuel thereinto, means for compressing the charge after its introduction and prior to ignition, an igniter, a resilient cushion substantially concentric to the expansion chamber against which the expansion due to combustion of the fuel expends its energy, means for introducing water between the fuel and the resilient cushion and means for preventing the direct return of the greater portion of the water after the ignition of the fuel.

53. A device for utilizing heat energy comprising a combustion and expansion chamber, means for introducing fuel thereinto, means for compressing the charge after its introduction and prior to ignition, an igniter, a chamber substantially concentric to the expansion to contain air or other resilient fluid against which the expansion due to combustion of the fuel expends its energy, means for introducing water between the fuel and the air chamber and a valve for preventing the direct return of the greater portion of the water after ignition of the fuel.

54. A device for utilizing heat energy comprising a combustion and expansion chamber, means for introducing fuel thereinto, means for compressing the charge after its introduction and prior to ignition, an igniter, a chamber substantially concentric to the expansion chamber to contain air or other resilient fluid against which the expansion due to combustion of the fuel expends its energy, a valve for introducing water between the fuel and the air chamber and a valve for preventing the direct return of the greater portion of the water after ignition of the fuel.

55. A device for utilizing heat energy comprising a combustion and expansion chamber, means for introducing a measured volume of fuel thereinto means for compressing the charge after its introduction and prior to ignition, an igniter, a resilient cushion substantially concentric to the expansion chamber against which the expansion due to combustion of the fuel expends its energy, means for introducing water between the fuel and the resilient cushion, and means for preventing the direct return of the greater portion of the water after ignition of the fuel.

56. A device for utilizing heat energy comprising a combustion and expansion chamber, means for introducing a measured volume of fuel thereinto, means for compressing the charge after its introduction and prior to ignition, an igniter, a chamber substantially concentric to the expansion chamber to contain air or other resilient fluid against which the expansion due to combustion of the fuel expends its energy, means for introducing water between the fuel and the air chamber and a valve for preventing the direct return of the greater portion of the water after the ignition of the fuel.

57. A device for utilizing heat energy comprising a combustion and expansion chamber, means for introducing a measured volume of fuel thereinto, means for compressing the charge after its introduction and prior to ignition, an igniter, a chamber substantially concentric to the expansion chamber to contain air or other resilient fluid against which the expansion due to combustion of the fuel expends its energy, a valve for the introduction of water between the fuel and the air chamber and a valve for preventing the direct return of the greater portion of the water after ignition of the fuel.

WILLIAM H. SMYTH.

Witnesses:
JOHN H. MILLER,
JESSE R. EOFF.